United States Patent
Claas

(10) Patent No.: US 8,018,806 B2
(45) Date of Patent: Sep. 13, 2011

(54) METHOD FOR DISCRIMINATING DISC

(75) Inventor: Johannes Franciscus Peterus Claas, Hsinchu (TW)

(73) Assignee: Lite-On It Corp., Taipei (TW)

( * ) Notice: Subject to any disclaimer, the term of this patent is extended or adjusted under 35 U.S.C. 154(b) by 0 days.

(21) Appl. No.: 12/815,717

(22) Filed: Jun. 15, 2010

(65) Prior Publication Data

US 2010/0315925 A1    Dec. 16, 2010

(30) Foreign Application Priority Data

Jun. 16, 2009 (CN) .......................... 2009 1 0147506

(51) Int. Cl.
*G11B 7/00* (2006.01)
(52) U.S. Cl. .................. 369/53.23; 369/53.2; 369/53.28; 369/44.28; 369/44.41
(58) Field of Classification Search .................. None
See application file for complete search history.

(56) References Cited

U.S. PATENT DOCUMENTS

| | | | | |
|---|---|---|---|---|
| 5,909,416 A * | 6/1999 | Matsui | ........................ | 369/44.41 |
| 6,747,931 B1 * | 6/2004 | Park | .......................... | 369/53.23 |
| 7,898,915 B2 * | 3/2011 | Baba | .......................... | 369/47.53 |

* cited by examiner

*Primary Examiner* — Muhammad N Edun
(74) *Attorney, Agent, or Firm* — WPAT, PC; Justin King

(57) ABSTRACT

A disc discriminating method for use in an optical disc drive includes the following steps. Firstly, an optical pickup head of the optical disc drive is controlled to move in a first direction when the optical pickup head is in a track-unlocked state. Then, a tracking error signal and a radio frequency signal are generated. According to the tracking error signal, a tracking error zero crossing signal is obtained. According to the radio frequency signal, a radio frequency zero crossing signal is obtained. According to a phase relation between the tracking error zero crossing signal and the radio frequency zero crossing signal, the disc is discriminated as an on-groove recording disc or an in-groove recording disc.

14 Claims, 8 Drawing Sheets

METHOD FOR DISCRIMINATING DISC

FIELD OF THE INVENTION

The present invention relates to a method for discriminating a disc, and more particularly to a method for discriminating whether a Blu-Ray disc is an on-groove recording disc or an in-groove recording disc.

BACKGROUND OF THE INVENTION

Blu-Ray discs are usually classified into two types, i.e. on-groove recording discs and in-groove recording discs. The on-groove recording disc is also referred as a high-to-low disc. The in-groove recording disc is also referred as a low-to-high disc. The configurations of these two types of Blu-Ray discs will be illustrated in more details as follows.

FIG. 1A is a schematic view of a typical on-groove recording disc. As shown in FIG. 1A, a plurality of groove tracks (G) and a plurality of land tracks (L) are alternately arranged on the data layer of the Blu-Ray disc. When an optical pickup head of an optical disc drive operates, the laser beams 20 emitted by a laser diode are focused by a lens 10 of the optical pickup head, and directed to a groove track (G) through an entrance surface 30 of the Blu-Ray disc. As such, a data is recorded on the groove track (G) or read out from the groove track (G). Such a Blu-Ray disc is an on-groove recording disc.

FIG. 1B is a schematic view of a typical in-groove recording disc. As shown in FIG. 1B, a plurality of groove tracks (G) and a plurality of land tracks (L) are alternately arranged on the data layer of the Blu-Ray disc. When an optical pickup head of an optical disc drive operates, the laser beams 20 emitted by a laser diode are focused by a lens 10 of the optical pickup head, and directed to a land track (L) through an entrance surface 30 of the Blu-Ray disc. As such, a data is recorded on the land track (L) or read out from the land track (L). Such a Blu-Ray disc is an in-groove recording disc.

As can be seen from FIGS. 1A and 1B, these two types of Blu-Ray discs are distinguished by the data recording locations. That is, data are recorded on the groove tracks (G) for the on-groove recording disc, but data are recorded on the land tracks (L) for the in-groove recording disc. In this context, the groove tracks and the land tracks are defined according to the specifications of ordinary discs such as compact discs (CDs) or digital versatile discs (DVDs). Comparatively, the distance between the groove track (G) and the entrance surface 30 is smaller than the distance between the land track (L) and the entrance surface 30.

Generally, after a disc is loaded into an optical disc drive, a startup procedure of the optical disc drive is done. In the startup procedure, a servo parameter calibration task and a disc discriminating task are implemented. After the servo parameter calibration task is implemented, the optical disc drive could accurately generate a tracking error signal (TE), a focusing error signal (FE), a radio frequency signal (RF), and the like for further servo control procedures. The disc discriminating task is implemented to discriminate the type of the disc that is loaded into the optical disc drive. An example of the type of disc includes a compact disc (CD), a digital versatile disc (DVD) or a Blu-Ray disc. In addition, it may also discriminate the types of a read-only memory (ROM) disc, a recordable disc or a rewritable disc.

However, up to now, the current optical disc drive fails to effectively discriminate whether the Blu-Ray disc is an on-groove recording disc or an in-groove recording disc. In a case that the disc is discriminated as the Blu-Ray disc in the startup procedure of the optical disc drive, the optical pickup head will perform a track-locking operation according to the tracking error signal (TE) and start a reading/recording procedure.

Generally, because the current optical disc drive fails to effectively discriminate whether the Blu-Ray disc is an on-groove recording disc or an in-groove recording disc in the startup procedure, after discriminating the disc is the Blu-Ray disc, the optical disc drive will first predetermine the Blu-ray disc as a specified type of Blu-Ray disc, for example an in-groove recording disc. Then, the optical pickup head will perform the track-locking operation for locking the information pickup point of the optical pickup head on the land track and start the reading/recording procedure. Once the data or the wobble information of the Blu-Ray disc is effectively read out by the optical disc drive, the Blu-Ray disc loaded in the optical disc drive is, therefore, confirmed as the in-groove recording disc. On the other hand, once the data or the wobble information of the Blu-Ray disc fails to be effectively read out by the optical disc drive, the Blu-Ray disc loaded in the optical disc drive is, then, confirmed as an on-groove recording disc.

The conventional method for discriminating the type of the Blu-Ray disc, however, still has some drawbacks. For example, if the data of the Blu-Ray disc fails to be read out by the optical disc drive according to the first predetermined type of the Blu-Ray disc, for example an in-groove recording disc, the servo parameter calibration task of the startup process needs to be implemented again in order to obtain calibrated servo parameters according to the other type of the Blu-Ray disc, for example an on-groove recording disc. After the servo parameter calibration task is implemented, the Blu-Ray disc is determined as the on-groove recording disc. As such, the optical pickup head will perform the track-locking operation for locking the information pickup point of the optical pickup head on the groove track to read out the data or the wobble information of the on-groove recording disc.

Of course, the Blu-Ray disc loaded in the optical disc drive could be first predetermined as an on-groove recording disc, and then the above verification steps are carried out. Since the procedures of re-performing the servo parameter calibration task and implementing the track-locking operation are time-consuming, the performance of the optical disc drive is deteriorated.

Therefore, there is a need of providing a disc discriminating method to obviate the drawbacks encountered from the prior art.

SUMMARY OF THE INVENTION

The present invention provides a method for discriminating whether a disc is an on-groove recording disc or an in-groove recording disc in a case that the optical pickup head is in a track-unlocked state.

In accordance with an aspect of the present invention, there is provided a disc discriminating method for use in an optical disc drive. The disc discriminating method includes the following steps. Firstly, an optical pickup head of the optical disc drive is controlled to move in a first direction when the optical pickup head is in a track-unlocked state. Then, a tracking error signal and a radio frequency signal are generated. According to the tracking error signal, a tracking error zero crossing signal is obtained. According to the radio frequency signal, a radio frequency zero crossing signal is obtained. According to a phase relation between the tracking error zero crossing signal and the radio frequency zero crossing signal, the disc is discriminated as an on-groove recording disc or an in-groove recording disc.

In accordance with another aspect of the present invention, there is provided a disc discriminating method for use in an optical disc drive. The disc discriminating method includes steps of controlling an optical pickup head of the optical disc drive to move in a first direction when the optical pickup head is in a track-unlocked state, generating a tracking error signal and a radio frequency signal, obtaining a top envelope signal according to the radio frequency signal, and discriminating whether the disc is an on-groove recording disc or an in-groove recording disc according to a phase relation between the tracking error signal and the top envelope signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
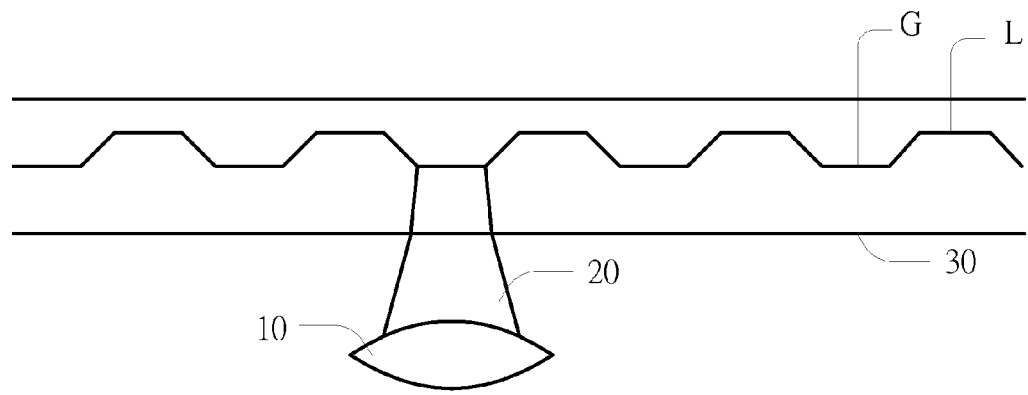
FIG. 1A is a schematic view of a typical on-groove recording disc.
Figure 1B:
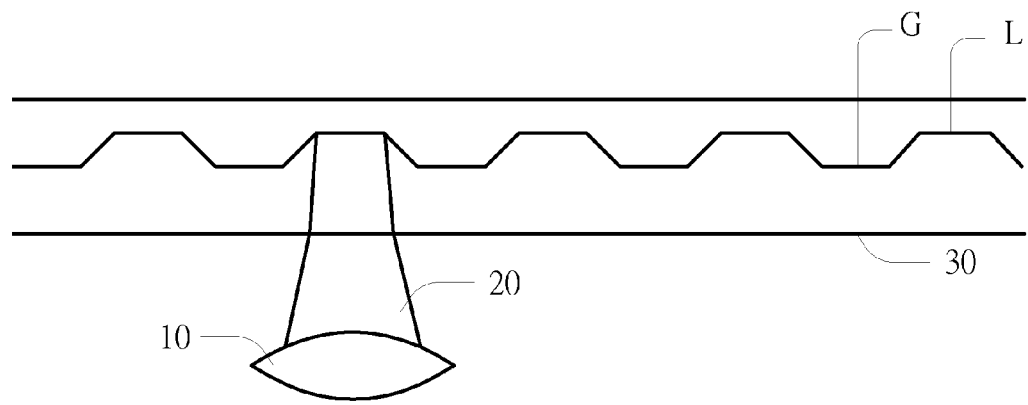
FIG. 1B is a schematic view of a typical in-groove recording disc.
Figure 2:
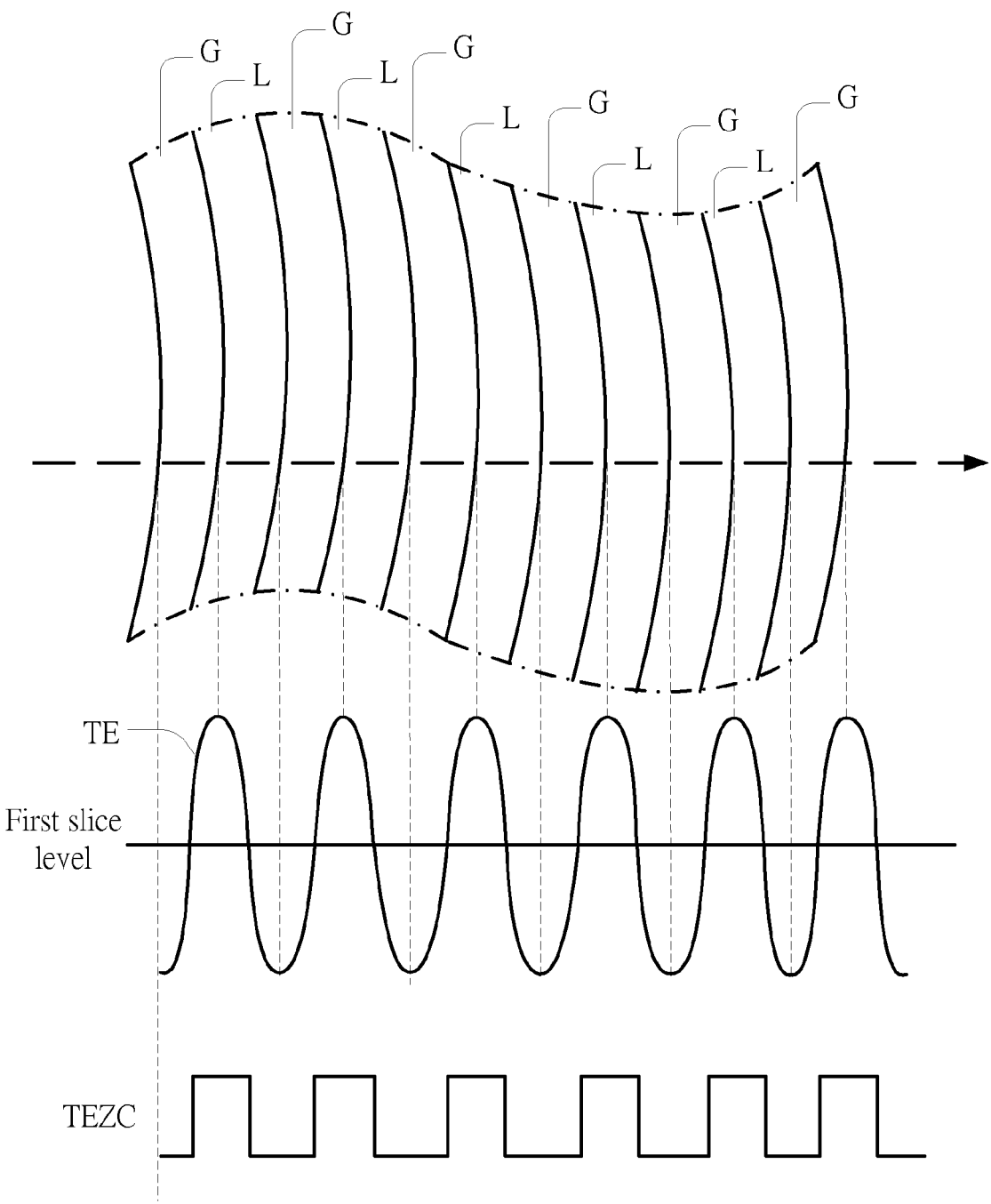
FIG. 2 is schematic timing waveform diagram illustrating a tracking error signal (TE) and a tracking error zero crossing signal (TEZC) when an optical pickup head of an optical disc drive is moved outwardly from an inner track to an outer track.

FIG. 2 is schematic timing waveform diagram illustrating a tracking error signal (TE) and a tracking error zero crossing signal (TEZC) when an optical pickup head of an optical disc drive is moved outwardly from an inner track to an outer track. The spiral tracks of the disc include a plurality of groove tracks (G) and a plurality of land tracks (L), which are alternately arranged on the data layer of the disc. After the disc is loaded into the optical disc drive, the optical pickup head emit laser beams and the disc starts to rotate. In a case that the optical pickup head is in a track-unlocked state and the optical pickup head is moved outwardly from an inner track to an outer track in the direction indicated by the arrow, the tracking error signal (TE) reveals a sine wave once the optical pickup head crosses one track. By computing the sine wave number of the tracking error signal (TE), the number of tracks that the optical pickup head has crossed in the track-seeking procedure is obtained.

As shown in FIG. 2, when the tracking error signal (TE) has the peak value, the optical pickup head is crossing the interface between the land track (L) and the groove track (G). When the tracking error signal (TE) has a zero level, the optical pickup head is disposed over the middle portion of the land track (L) and the groove track (G).

According to the properties of the tracking error signal (TE) shown in FIG. 2, in a case that the Blu-Ray disc is an in-groove recording disc for recording data on the land tracks (L), the optical disc drive enters the track-locking operation during the tracking error signal (TE) drops down from the positive peak value to the negative peak value. As a consequence, the information pickup point of the optical pickup head is locked on the land track (L), thereby accurately reading out the data or the wobble information of the Blu-Ray disc.

Whereas, in a case that the Blu-Ray disc is an on-groove recording disc for recording data on the groove track (G), the optical disc drive enters the track-locking operation during the tracking error signal (TE) arises from the negative peak value to the positive peak value. As a consequence, the information pickup point of the optical pickup head is locked on the groove track (G), thereby accurately reading out the data or the wobble information of the Blu-Ray disc.

Furthermore, when the optical disc drive operates, the control circuit of the optical disc drive generates a tracking error zero crossing signal (TEZC). The control circuit could compare the tracking error signal (TE) with a first slice level, so that the tracking error signal (TE) in an analog form is converted into the tracking error zero crossing signal (TEZC) in a digital form. The relationship between the tracking error signal (TE) and the tracking error zero crossing signal (TEZC) is illustrated with reference to FIG. 2. Alternatively, the number of tracks that the optical pickup head has crossed in the track-seeking procedure is also obtainable by computing the pulse wave number of the tracking error zero crossing signal (TEZC).

Moreover, the optical disc drive could generate a radio frequency signal (RF). After the track-locking operation of the optical pickup head is implemented, the radio frequency signal (RF) indicating the pit-land information on the tracks of the disc can be derived. The control circuit of the optical disc drive could obtain the disc information according to the radio frequency signal (RF).

Figure 3:
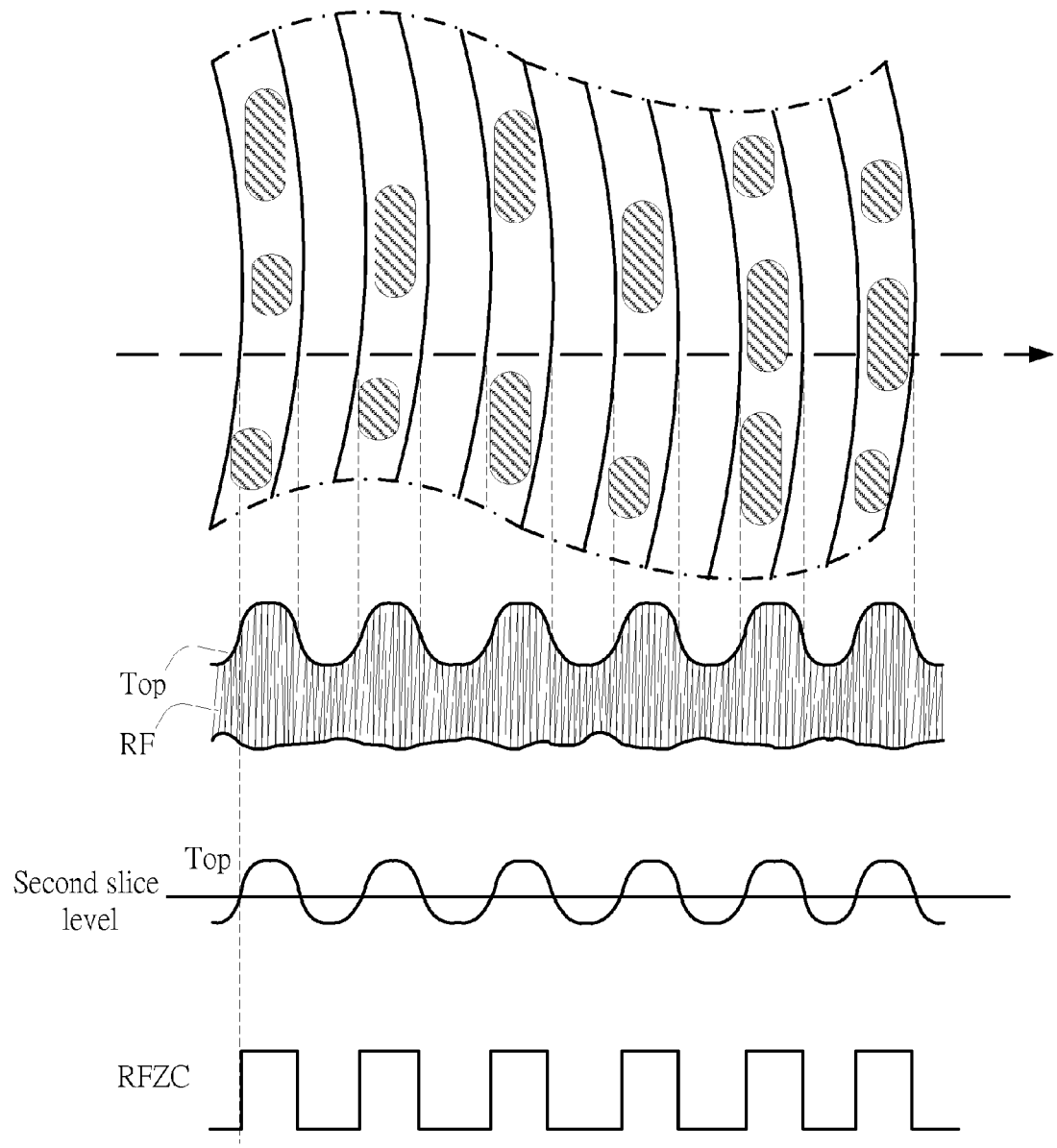
FIG. 3 is schematic timing waveform diagram illustrating a radio frequency signal (RF) when an optical pickup head of an optical disc drive is moved outwardly from an inner track to an outer track.

In a case that the optical pickup head is in the track-unlocked state and the optical pickup head is moved between tracks, the radio frequency signal (RF) could also indicate a position of the optical pickup head. FIG. 3 is schematic timing waveform diagram illustrating a radio frequency signal (RF) when an optical pickup head of an optical disc drive is moved outwardly from an inner track to an outer track.

In a case that the optical pickup head is in the track-unlocked state and the optical pickup head is moved outwardly from an inner track to an outer track in the direction indicated by the arrow, the amplitude of the radio frequency signal (RF) is sharply varied once the optical pickup head crosses one track containing the recorded data. Whereas, the amplitude of the radio frequency signal (RF) is not sharply varied once the optical pickup head crosses one track without containing the recorded data. It is of course that the track containing the recorded data could be the land track (L) or the groove track (G) for the Blu-Ray disc.

Furthermore, when the optical disc drive operates, the control circuit of the optical disc drive generates a top-envelope signal (Top) according to the radio frequency signal (RF). The control circuit could compare the top-envelope signal (Top) with a second slice level, so that the top-envelope signal (Top) in an analog form is converted into a radio frequency zero crossing signal (RFZC) in a digital form. The relationships between the radio frequency signal (RF), the top-envelope signal (Top) and the radio frequency zero crossing signal (RFZC) are illustrated with reference to FIG. 3. Alternatively, the number of tracks that the optical pickup head has crossed in the track-seeking procedure is also obtainable by computing the pulse wave number of the radio frequency zero crossing signal (RFZC).

In other words, in a case that the optical pickup head is in the track-unlocked state, the control circuit of the optical disc drive could derive the tracking error zero crossing signal (TEZC) and the radio frequency zero crossing signal (RFZC) by moving the optical pickup head from an inner track to an outer track and discriminate whether the Blu-Ray disc is an on-groove recording disc or an in-groove recording disc according to the relationship between the tracking error zero crossing signal (TEZC) and the radio frequency zero crossing signal (RFZC).

Figure 4:
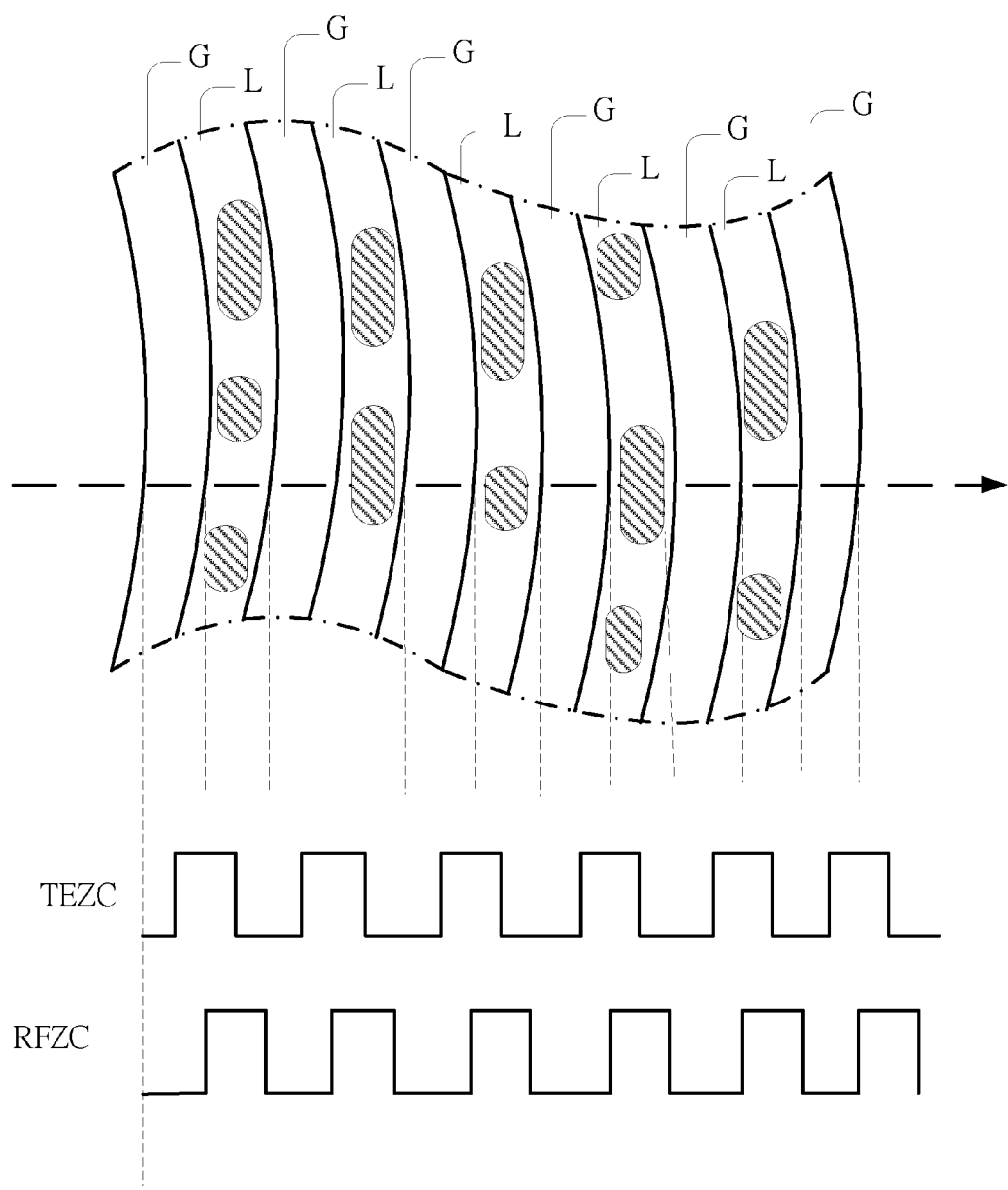
FIG. 4 is schematic timing waveform diagram illustrating the relationship between the tracking error zero crossing signal (TEZC) and the radio frequency zero crossing signal (RFZC) of an in-groove recording disc.

FIG. 4 is schematic timing waveform diagram illustrating the relationship between the tracking error zero crossing signal (TEZC) and the radio frequency zero crossing signal (RFZC) of an in-groove recording disc. In a case that the optical pickup head is in a track-unlocked state and the optical pickup head is moved outwardly from an inner track to an outer track in the direction indicated by the arrow, the tracking error zero crossing signal (TEZC) leads the radio frequency zero crossing signal (RFZC) by a phase of about 90 degrees.

Figure 5:
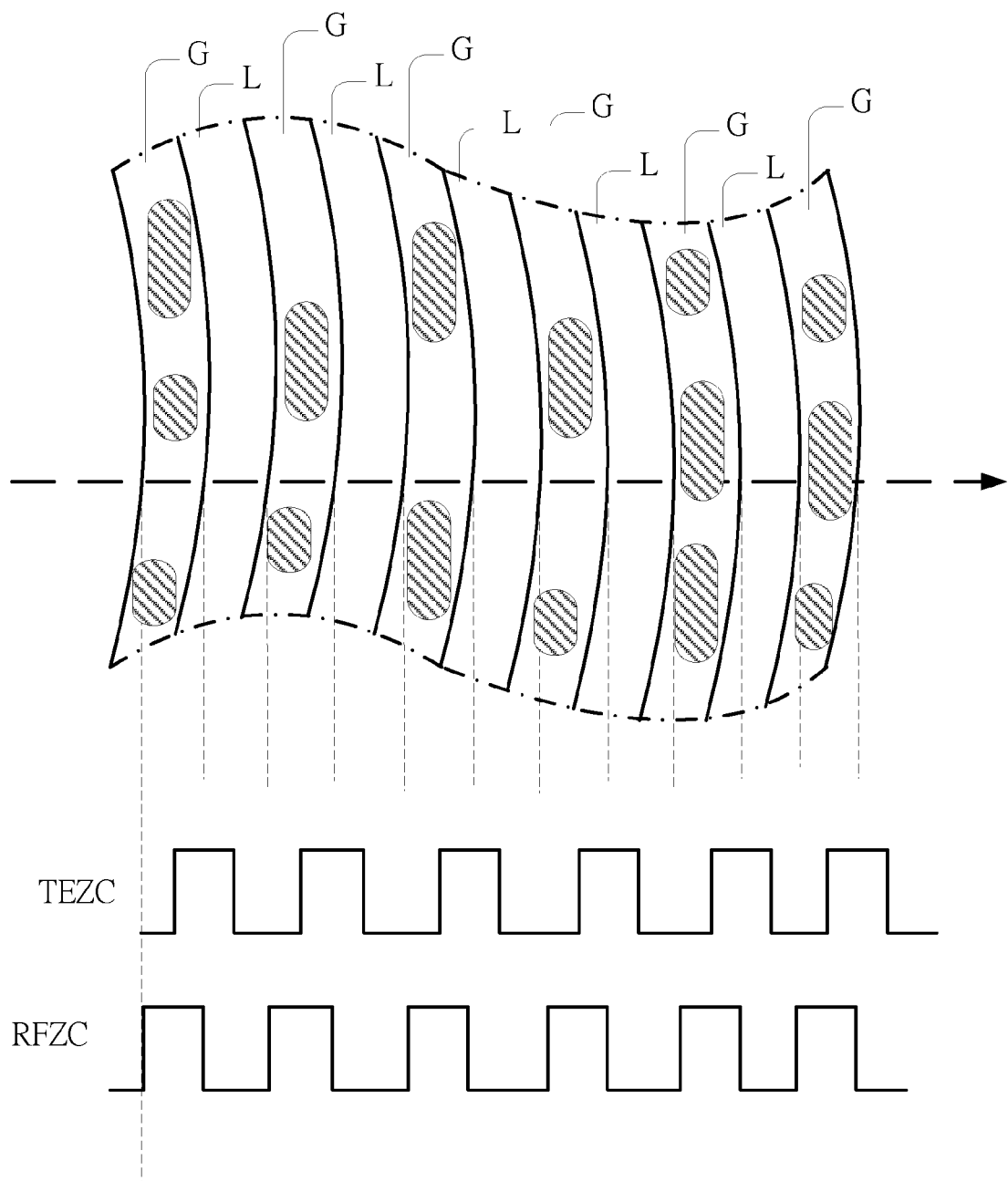
FIG. 5 is schematic timing waveform diagram illustrating the relationship between the tracking error zero crossing signal (TEZC) and the radio frequency zero crossing signal (RFZC) of an on-groove recording disc.

FIG. 5 is schematic timing waveform diagram illustrating the relationship between the tracking error zero crossing signal (TEZC) and the radio frequency zero crossing signal (RFZC) of an on-groove recording disc. In a case that the optical pickup head is in a track-unlocked state and the optical pickup head is moved outwardly from an inner track to an outer track in the direction indicated by the arrow, the tracking error zero crossing signal (TEZC) lags behind the radio frequency zero crossing signal (RFZC) by a phase of about 90 degrees.

In other words, in a case that the optical pickup head is in a track-unlocked state, the control circuit of the optical disc drive could discriminate whether the Blu-Ray disc is an on-groove recording disc or an in-groove recording disc according to the phase relation between the tracking error zero crossing signal (TEZC) and the radio frequency zero crossing signal (RFZC).

Figure 6:
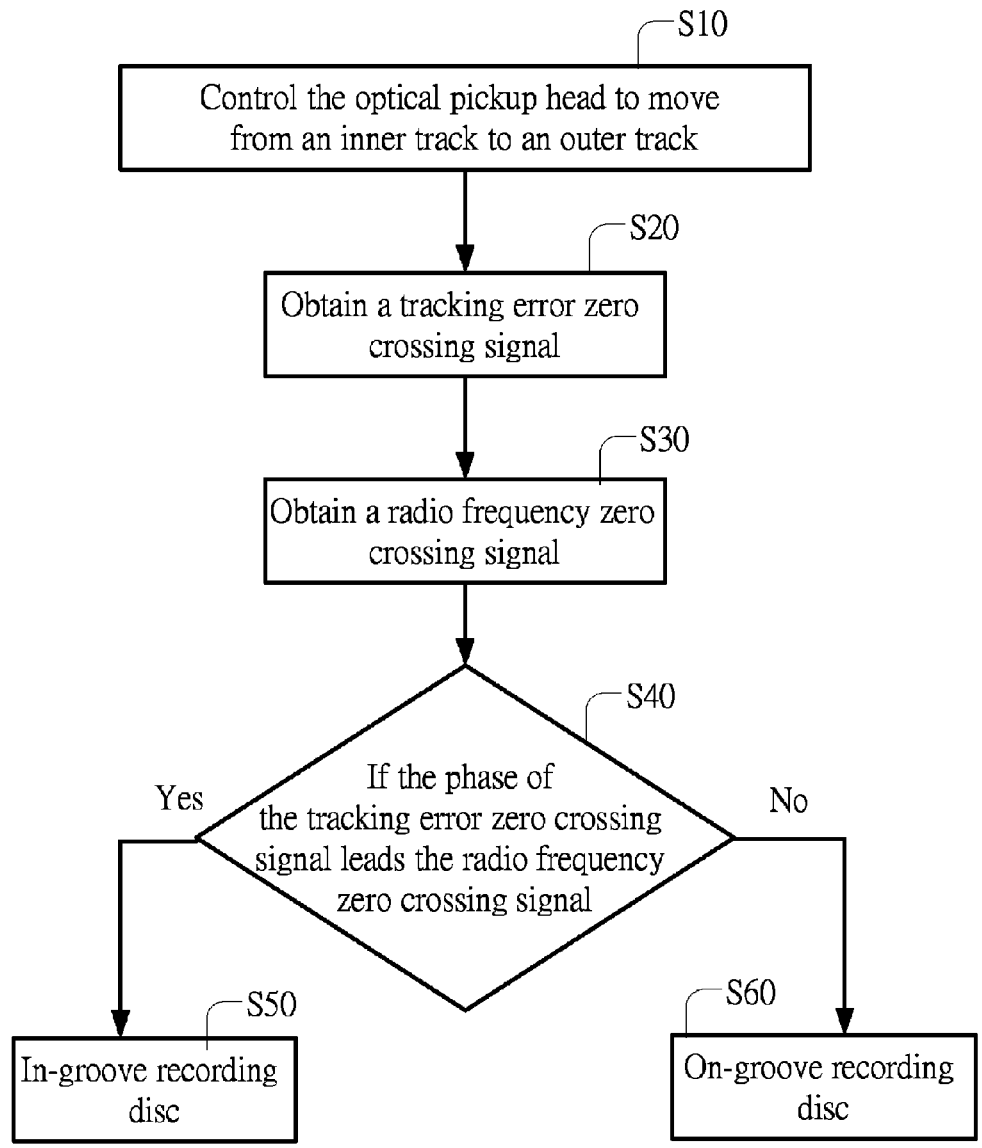
FIG. 6 is a flowchart illustrating a disc discriminating method according to an embodiment of the present invention.

FIG. 6 is a flowchart illustrating a disc discriminating method according to an embodiment of the present invention. During the startup procedure of the optical disc drive, the optical pickup head is controlled to move from an inner track to an outer track (Step S10). By reading the disc, a tracking error signal (TE) and a radio frequency signal (RF) are obtained. Next, a tracking error zero crossing signal (TEZC) is obtained according to the tracking error signal (TE) (Step S20). Next, a radio frequency zero crossing signal (RFZC) is obtained according to the radio frequency signal (RF) (Step S30). Next, the phase relation between the tracking error zero crossing signal (TEZC) and the radio frequency zero crossing signal (RFZC) is discriminated (Step S40). Once the phase of the tracking error zero crossing signal (TEZC) leads the radio frequency zero crossing signal (RFZC), the Blu-Ray disc is discriminated as an in-groove recording disc (Step S50). Once the phase of the tracking error zero crossing signal (TEZC) does not lead the radio frequency zero crossing signal (RFZC), the Blu-Ray disc is discriminated as an on-groove recording disc (Step S60).

The method for discriminating whether a Blu-Ray disc is an on-groove recording disc or an in-groove recording disc could be implemented by using a disc discriminating circuit. Nevertheless, the method for discriminating whether a Blu-Ray disc is an on-groove recording disc or an in-groove recording disc could be implemented by using firmware.

Figure 7A:
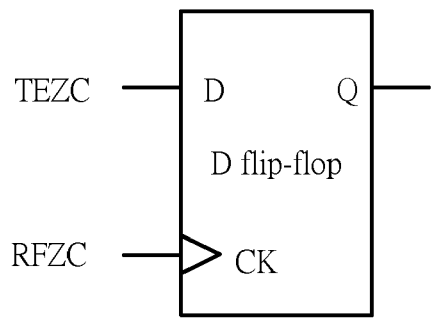
FIG. 7A is a schematic circuit diagram illustrating a control circuit used in the disc discriminating method of the present invention.
Figure 7B:
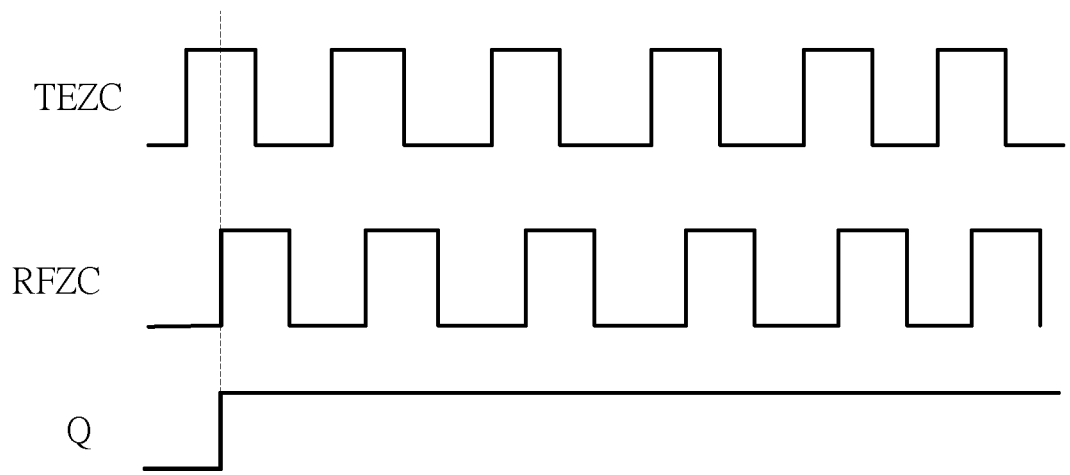
FIGS. 7B and 7C are schematic timing waveform diagrams illustrating related signals processed by the control circuit of FIG. 7A.
Figure 7C:
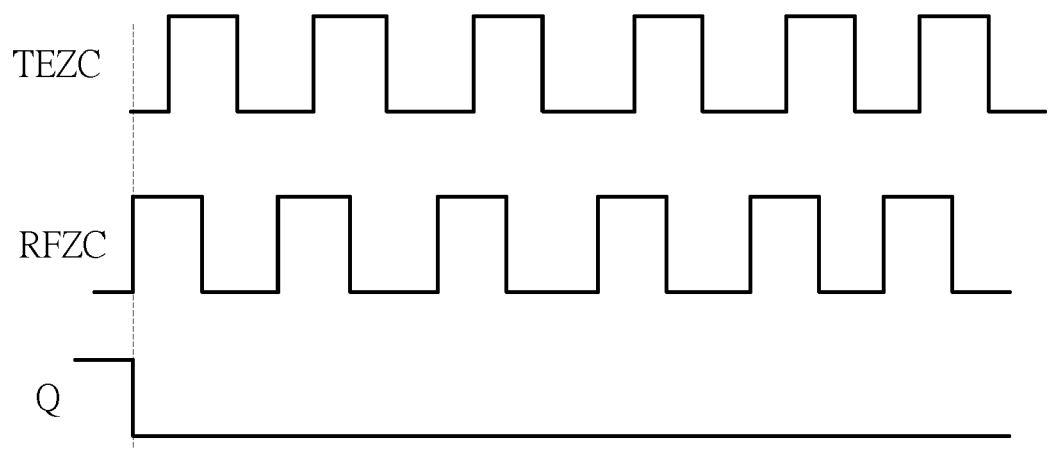

Moreover, the control circuit could be used for discriminating the disc. FIG. 7A is a schematic circuit diagram illustrating a control circuit used in the disc discriminating method of the present invention. FIGS. 7B and 7C are schematic timing waveform diagrams illustrating related signals processed by the control circuit of FIG. 7A.

In this embodiment, as shown in FIG. 7A, the control circuit is a D flip-flop. The tracking error zero crossing signal (TEZC) is inputted into the data input terminal (D) of the D flip-flop. The radio frequency zero crossing signal (RFZC) is inputted into the clock terminal (CK) of the D flip-flop.

As shown in FIG. 7B, in a case that the Blu-Ray disc is an in-groove recording disc, a high-level data is latched at the data output terminal (Q) of the D flip-flop in response to a rising edge of the radio frequency zero crossing signal (RFZC). As shown in FIG. 7C, in a case that the Blu-Ray disc is an on-groove recording disc, a low-level data is latched at the data output terminal (Q) of the D flip-flop in response to a rising edge of the radio frequency zero crossing signal (RFZC). In other words, the control circuit of the optical disc drive could discriminate whether the Blu-Ray disc is an on-groove recording disc or an in-groove recording disc according to the voltage level at the data output terminal (Q) of the D flip-flop.

It is noted that, however, those skilled in the art will readily observe that numerous modifications and alterations may be made while retaining the teachings of the invention. For example, in some embodiments, the radio frequency zero crossing signal (RFZC) is inputted into the data input terminal (D) of the D flip-flop, the tracking error zero crossing signal (TEZC) is inputted into the clock terminal (CK) of the D flip-flop, and the control circuit of the optical disc drive could discriminate the type of the Blu-Ray disc according to the voltage level at the data output terminal (Q) of the D flip-flop.

In the above embodiments, the control circuit of the optical disc drive could discriminate whether the Blu-Ray disc is an on-groove recording disc or an in-groove recording disc according to the relationship between the tracking error zero crossing signal (TEZC) and the radio frequency zero crossing signal (RFZC). Nevertheless, the control circuit of the optical disc drive could discriminate whether the Blu-Ray disc is an on-groove recording disc or an in-groove recording disc according to the relationship between the tracking error signal (TE) and the top-envelope signal (Top) of the radio frequency signal (RF). In a case that the optical pickup head is in a track-unlocked state and the optical pickup head is moved outwardly from an inner track to an outer track, the Blu-Ray disc is discriminated as an in-groove recording disc if the phase of the tracking error signal (TE) leads the top-envelope signal (Top), and the Blu-Ray disc is discriminated as an on-groove recording disc if the phase of the tracking error signal (TE) lags behind the top-envelope signal (Top).

In the above embodiments, the type of the Blu-Ray disc is discriminated by acquiring the relationship between associated signals when the optical pickup head is moved from an inner track to an outer track. Nevertheless, the type of the Blu-Ray disc could be discriminated by acquiring the relationship between associated signals when the optical pickup head is moved from an outer track to an inner track.

Hereinafter, another embodiment of a disc discriminating method of the present invention will be illustrated. In a case that the optical pickup head is in a track-unlocked state and the optical pickup head is moved inwardly from an outer track to an inner track, the type of the Blu-Ray disc could be discriminated according to the relationship between associated signals. For example, in a case that the optical pickup head is in a track-unlocked state, there is a phase difference of 180 degrees between the tracking error signal (TE) obtained when the optical pickup head is moved outwardly from an inner track to an outer track and the tracking error signal (TE) obtained when the optical pickup head is moved inwardly from an outer track to an inner track. Similarly, there is a phase difference of 180 degrees between the radio frequency signal (RF) obtained when the optical pickup head is moved outwardly from an inner track to an outer track and the radio frequency signal (RF) obtained when the optical pickup head is moved inwardly from an outer track to an inner track.

Figure 8:
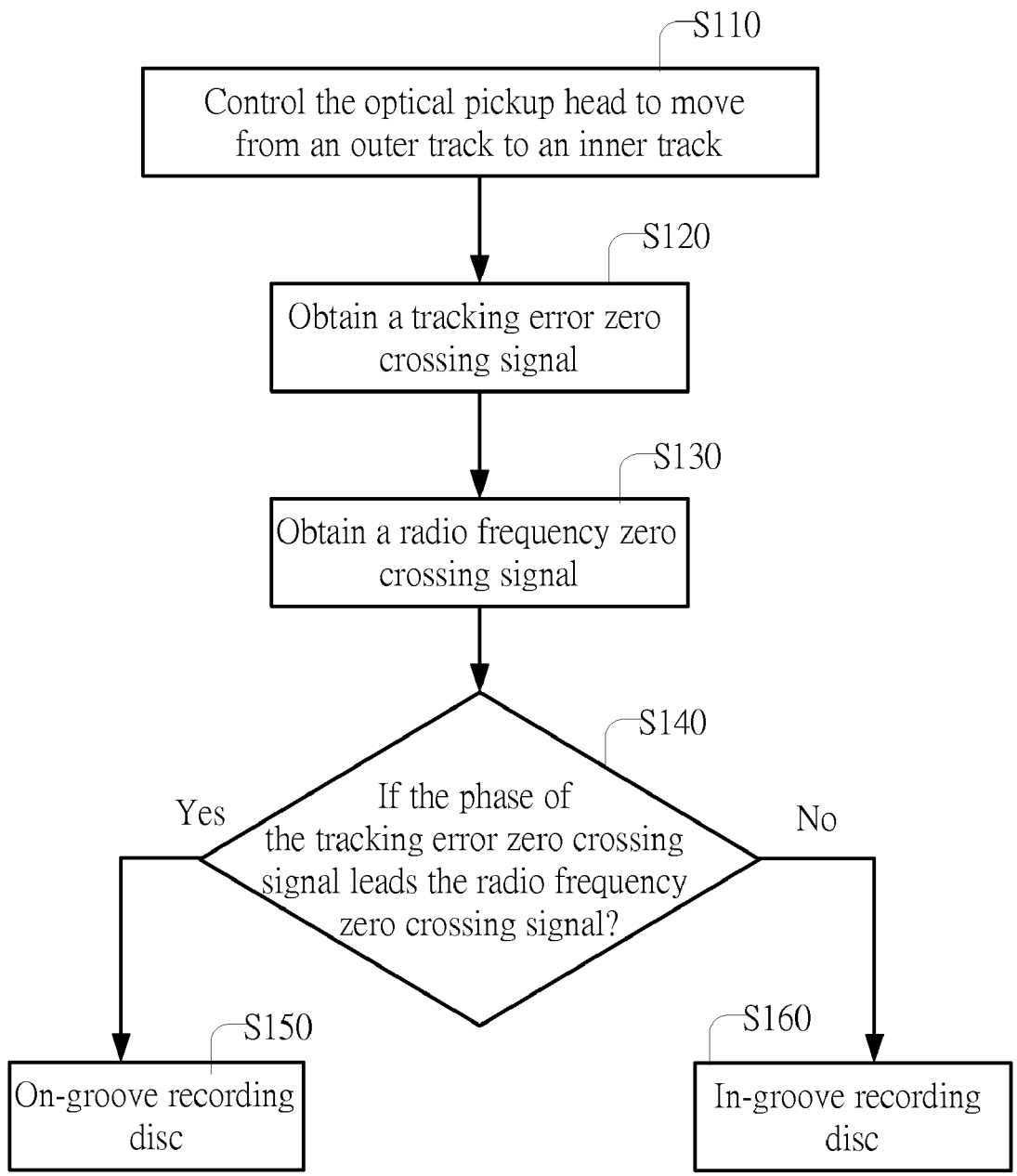
FIG. 8 is a flowchart illustrating a disc discriminating method according to another embodiment of the present invention.

FIG. 8 is a flowchart illustrating a disc discriminating method according to another embodiment of the present invention. During the startup procedure of the optical disc drive, the optical pickup head is controlled to move from an outer track to an inner track (Step S110). By reading the disc, a tracking error signal (TE) and a radio frequency signal (RF) are obtained. Next, a tracking error zero crossing signal (TEZC) is obtained according to the tracking error signal (TE) (Step S120). Next, a radio frequency zero crossing signal (RFZC) is obtained according to the radio frequency signal (RF) (Step S130). Next, the phase relation between the tracking error zero crossing signal (TEZC) and the radio frequency zero crossing signal (RFZC) is discriminated (Step S140). As previously described, there is a phase difference of 180 degrees between the tracking error signal (TE) obtained when the optical pickup head is moved outwardly and the tracking error signal (TE) obtained when the optical pickup head is moved inwardly. Once the phase of the tracking error zero crossing signal (TEZC) leads the radio frequency zero crossing signal (RFZC), the Blu-Ray disc is discriminated as an on-groove recording disc (Step S150). Once the phase of the tracking error zero crossing signal (TEZC) does not lead the radio frequency zero crossing signal (RFZC), the Blu-Ray disc is discriminated as an in-groove recording disc (Step S160).

Similarly, the control circuit of the optical disc drive could discriminate whether the Blu-Ray disc is an on-groove recording disc or an in-groove recording disc according to the relationship between the tracking error signal (TE) and the top-envelope signal (Top) of the radio frequency signal (RF). In a case that the optical pickup head is in a track-unlocked state and the optical pickup head is moved inwardly from an outer track to an inner track, the Blu-Ray disc is discriminated as an on-groove recording disc if the phase of the tracking error signal (TE) leads the top-envelope signal (Top), and the Blu-Ray disc is discriminated as an in-groove recording disc if the phase of the tracking error signal (TE) lags behind the top-envelope signal (Top).

From the above description, the method for discriminating whether a disc is an on-groove recording disc or an in-groove recording disc is implemented when the optical pickup head is in a track-unlocked state. By realizing the moving direction of the optical pickup head, the type of the Blu-Ray disc could be discriminated by acquiring the relationship between associated signals. As a consequence, the possibility of erroneously discriminating the Blu-Ray disc is minimized. Since the disc discriminating method of the present invention is time-saving, the performance of the optical disc drive is enhanced.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A disc discriminating method for use in an optical disc drive, the disc discriminating method comprising steps of:
   controlling an optical pickup head of the optical disc drive to move in a first direction when the optical pickup head is in a track-unlocked state;
   generating a tracking error signal and a radio frequency signal;
   obtaining a tracking error zero crossing signal according to the tracking error signal;
   obtaining a radio frequency zero crossing signal according to the radio frequency signal; and
   discriminating whether the disc is an on-groove recording disc or an in-groove recording disc according to a phase relation between the tracking error zero crossing signal and the radio frequency zero crossing signal.

2. The disc discriminating method according to claim 1 wherein the optical disc drive is moved from an inner track to an outer track in the first direction.

3. The disc discriminating method according to claim 2 wherein the disc is discriminated as the in-groove recording disc if the phase of the tracking error zero crossing signal leads the radio frequency zero crossing signal, and the disc is discriminated as the on-groove recording disc if the phase of the tracking error zero crossing signal lags behind the radio frequency zero crossing signal.

4. The disc discriminating method according to claim 2 wherein the tracking error zero crossing signal is latched in response to a rising edge of the radio frequency zero crossing signal, and the disc is discriminated as the in-groove recording disc or the on-groove recording disc according to a level status of the latched tracking error zero crossing signal.

5. The disc discriminating method according to claim 4 wherein the disc is discriminated as the in-groove recording disc if the latched tracking error zero crossing signal is at a high-level status, and the disc is discriminated as the on-groove recording disc if the latched tracking error zero crossing signal is at a low-level status.

6. The disc discriminating method according to claim 1 wherein the disc is a Blu-Ray disc.

7. The disc discriminating method according to claim 1 wherein the optical disc drive is moved from an outer track to an inner track in the first direction.

8. The disc discriminating method according to claim 7 wherein the disc is discriminated as the on-groove recording disc if the phase of the tracking error zero crossing signal leads the radio frequency zero crossing signal, and the disc is discriminated as the in-groove recording disc if the phase of the tracking error zero crossing signal lags behind the radio frequency zero crossing signal.

9. A disc discriminating method for use in an optical disc drive, the disc discriminating method comprising steps of:

controlling an optical pickup head of the optical disc drive to move in a first direction when the optical pickup head is in a track-unlocked state;

generating a tracking error signal and a radio frequency signal;

obtaining a top envelope signal according to the radio frequency signal; and discriminating whether the disc is an on-groove recording disc or an in-groove recording disc according to a phase relation between the tracking error signal and the top envelope signal.

10. The disc discriminating method according to claim 9 wherein the optical disc drive is moved from an inner track to an outer track in the first direction.

11. The disc discriminating method according to claim 10 wherein the disc is discriminated as the in-groove recording disc if the phase of the tracking error signal leads the top envelope signal, and the disc is discriminated as the on-groove recording disc if the phase of the tracking error signal lags behind the top envelope signal.

12. The disc discriminating method according to claim 9 wherein the disc is a Blu-Ray disc.

13. The disc discriminating method according to claim 9 wherein the optical disc drive is moved from an outer track to an inner track in the first direction.

14. The disc discriminating method according to claim 13 wherein the disc is discriminated as the on-groove recording disc if the phase of the tracking error signal leads the top envelope signal, and the disc is discriminated as the in-groove recording disc if the phase of the tracking error signal lags behind the top envelope signal.

* * * * *